W. C. EHMKA.
AIR CIRCULATING SYSTEM FOR INDUSTRIAL OVENS.
APPLICATION FILED JAN. 3, 1921.

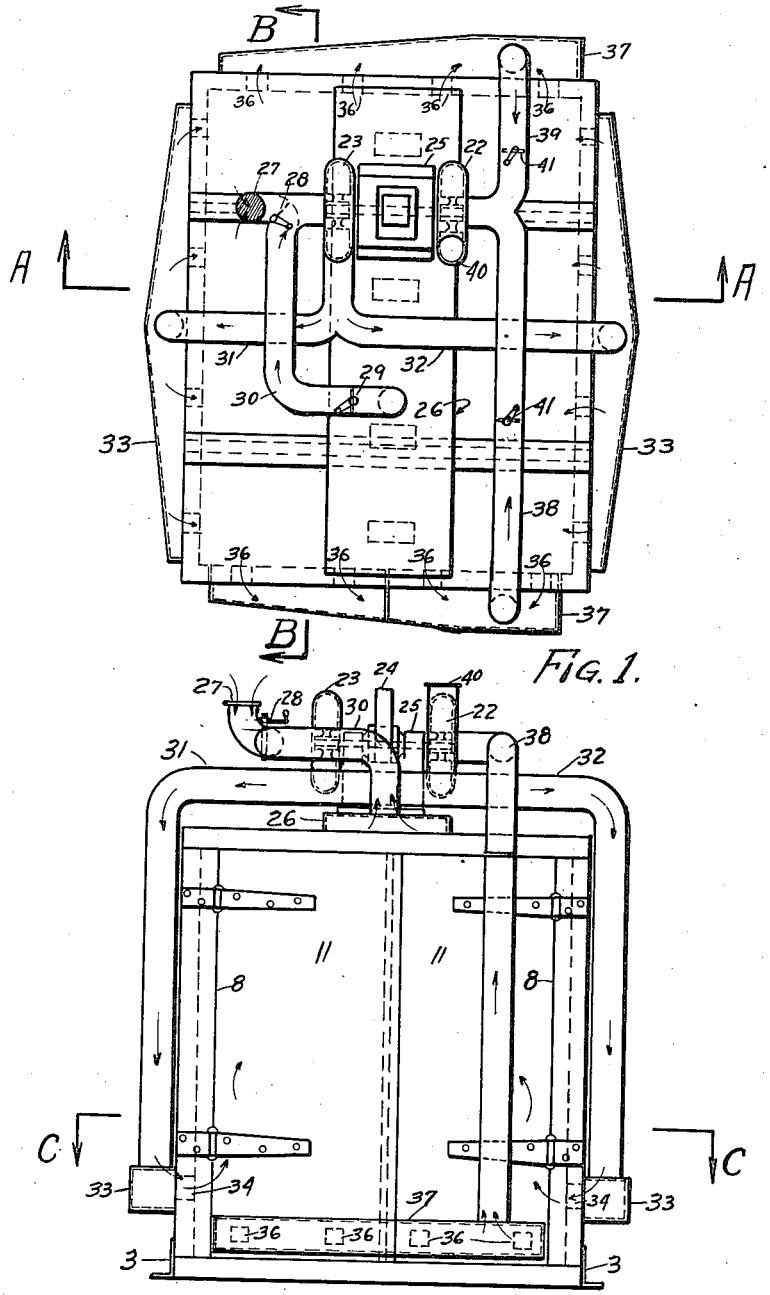

1,421,429.

Patented July 4, 1922.
4 SHEETS—SHEET 2.

W. C. EHMKA.
AIR CIRCULATING SYSTEM FOR INDUSTRIAL OVENS.
APPLICATION FILED JAN. 3, 1921.

1,421,429.

Patented July 4, 1922.
4 SHEETS—SHEET 3.

WITNESSES:
Joseph H. Martin
Harry D. Fenske

INVENTOR.
Wm C. Ehmka
BY Myron J. Dikeman
ATTORNEY.

UNITED STATES PATENT OFFICE.

WILLIAM C. EHMKA, OF DETROIT, MICHIGAN, ASSIGNOR TO DETROIT SHEET METAL WORKS, OF DETROIT, MICHIGAN, A PARTNERSHIP FIRM.

AIR-CIRCULATING SYSTEM FOR INDUSTRIAL OVENS.

1,421,429.  Specification of Letters Patent.  Patented July 4, 1922.

Original application filed June 14, 1920, Serial No. 388,974. Divided and this application filed January 3, 1921. Serial No. 434,777.

*To all whom it may concern:*

Be it known that I, WILLIAM C. EHMKA, a citizen of the United States, residing at the city of Detroit, county of Wayne, State of Michigan (whose post-office address is 453 Kitchener Ave.), have invented certain new and useful Improvements in Air-Circulating Systems for Industrial Ovens, and declare the following to be a full, clear, and exact description of the same, such as will enable others skilled in the art to which it pertains to make and use the same, reference being had to the accompanying drawings, which form a part of these specifications.

This application is made as a division required by the Patent Office, of a prior application, Serial No. 388,974, filed under date of June 14, 1920, and the former filing date is hereby reserved.

The objects of my invention are to provide an efficient air circulating system for an industrial oven, to separate the light air from the heavy gases as they form during the baking or drying process in the oven.

Another object is to provide a double fan system whereby the circulating and exhaust fans may operate as one unit, and produce a uniform and steady flow of air through the entire oven.

Another object is to provide a system that will re-circulate the light hot air through the oven, and exhaust the heavy gases in the open air.

It is still a further object of my invention to secure simplicity and construction efficiency in operation, and one that is at all times easily controlled and regulated.

These several objects are secured in their preferred form by the construction and arrangement of parts as are more fully hereinafter described.

Similar parts on all drawing are marked by similar numerals.

Fig. 1 is a top view of the oven, showing in plan the ventilating system, and the general construction of the oven units.

Fig. 2 is a front view of the oven showing the entrance door and air circulating system.

I will now describe more fully the detailed construction and the working parts thereof, referring to the accompanying drawings and the marks thereon.

The construction of the oven may be of any desired form, or arrangement of parts and materials to form suitable heat retaining walls. The following description is a preferred form, and is the one in present use in connection with the air circulating system herein described and claimed.

Figure 3:
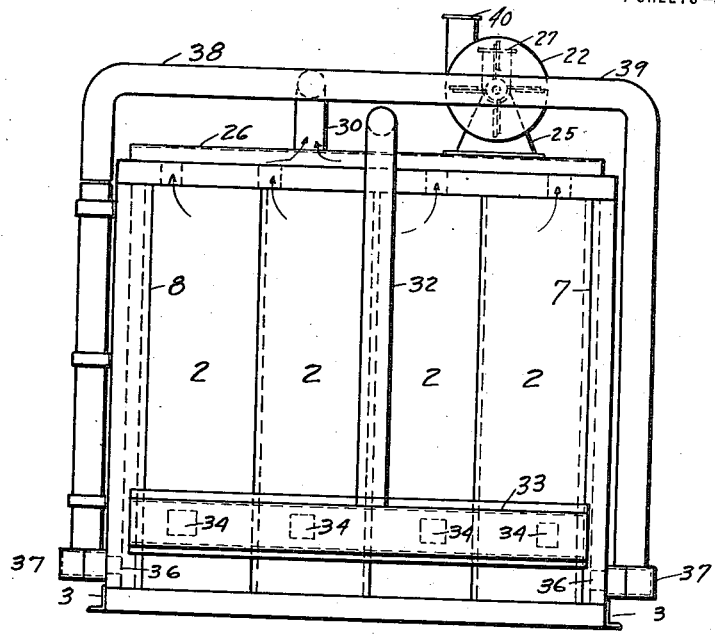
Fig. 3 is a side view of the oven showing the air chambers and its connection to the system.
Figure 4:
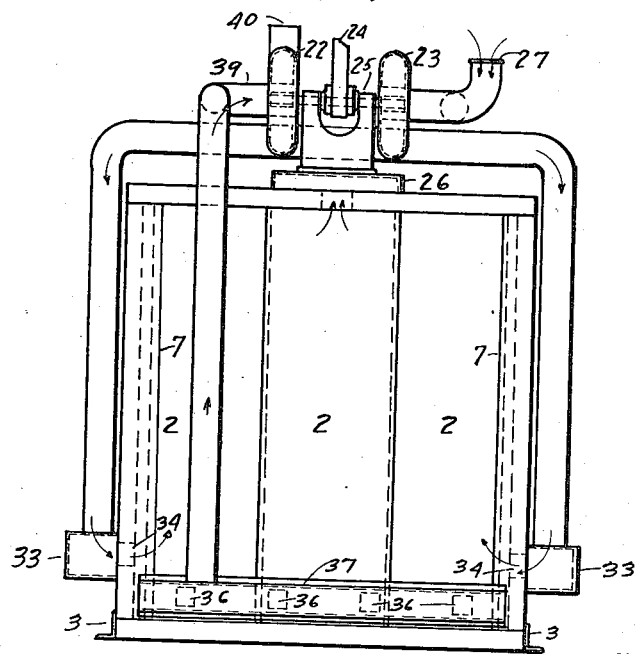
Fig. 4 is a rear view of the oven and the circulating system.
Figure 5:
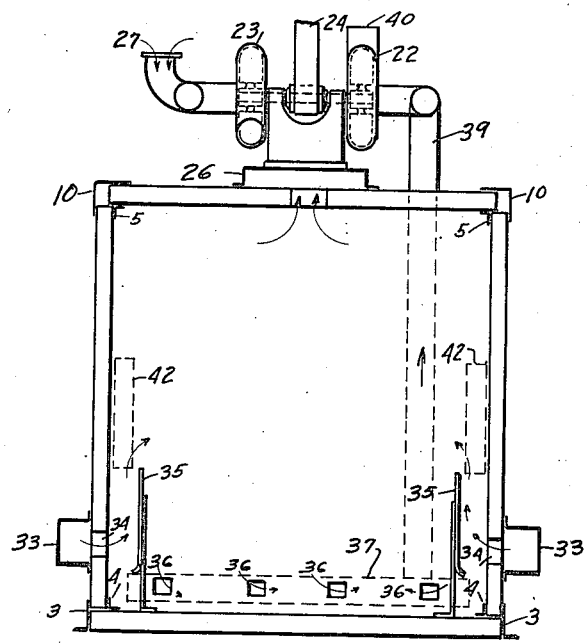
Fig. 5 is a sectional view —AA— as is shown on Fig. 1, showing the interior circulating and heating units.
Figure 6:
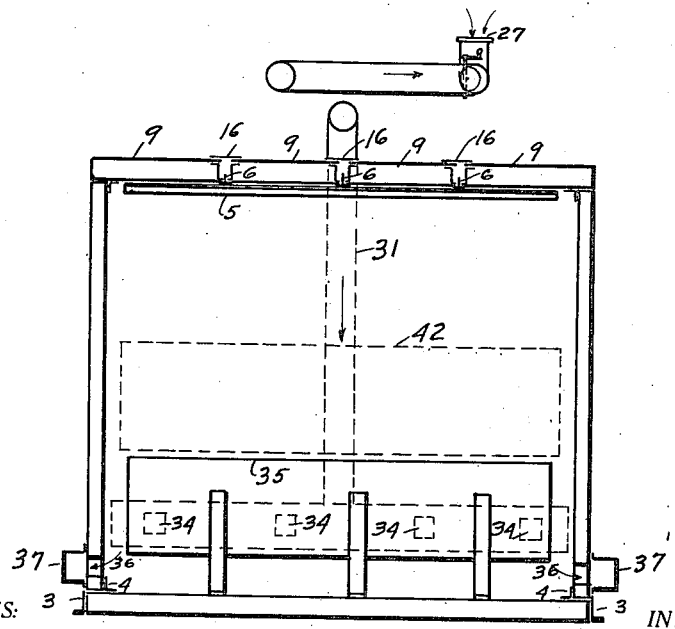
Fig. 6 is a sectional view —BB—, as is shown on Fig. 1, showing the baffle plates and heat units.
Figure 7:
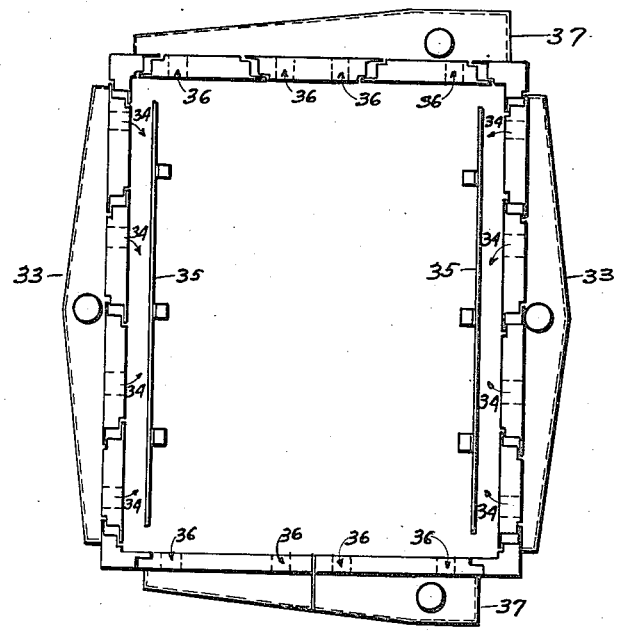
Fig. 7 is a sectional view —CC— as is shown in Fig. 2, showing the arrangement of the plenum chambers and exhaust chambers.

The oven walls consist of portable rectangular panels which are fastened together in erecting the oven. The floor is constructed of a suitable heat retaining material, and placed on the oven foundation. Mounted on the floor slabs are the wall panels 2, comprised of a sheet metal jacket riveted together to form a hollow rectangular panel, and filled with a heat retaining material. These slabs are securely fastened together at the edges by means of lap joints and screws. The joint also provides a space between the edges of the panels which is filled with a loose heat retaining material, thus giving the panel room to expand. The panels are held in place by means of angle irons 3 and 4, securely fastened to the edge of the floor slab and allowing the wall panels to slide freely therein. The wall corners 7 and 8 are separate units but of similar construction and joined to the wall panels in the same manner. At the top of the wall slabs are securely fastened angle irons 5, as is shown in Fig. 5 and Fig. 6, and supports the roof T-bars 6. Between the T-bars are placed the roof slabs 9, which are of similar construction to the wall panels. The opening between the roof panels is filled with a loose heat retaining material, and the panels are held in place by the cover plates 16 by means of screws and slotted holes, to allow for the expansion due to the oven heat. The roof panels extend slightly beyond the inner edge of the wall panels to form a seal for retaining the loose heat retaining material in the corner, and is covered by the cornice plate 10.

At the front side of the oven are the doors 11, thus giving free access to the oven for placing and removing materials therein for drying or baking.

The size of the oven may be varied by changing the number of wall panels in the construction thereof.

The walls may be made of any desired thickness for retaining heat to any desired degree. And likewise the panels may be made of any desired width.

The oven and circulating system may be of a single unit, or in a series of ovens placed side by side and the circulating system extending through all of the units or ovens.

Inside the oven, and supported on the walls are the heat units 42, so placed as to come in contact with all of the air from the circulating fan as it enters the oven through the portals 34, and by means of the baffle plates 35. The heat units may be of any desired type.

In connection with the oven as described, or any type of oven, is the air circulating system comprised of the double fans 22 and 23. These fans may be located at the top of the oven or at any convenient position suitable for making connections. The double fans are placed on a common shaft and supported by the main pedestal 25, and operated by the drive belt 24. Fan 23 is the circulating fan drawing its supply of air for the oven from the exhaust chamber 26 and the breather 27. The exhaust chamber 26 is located in the roof of the oven, and receives the light heated air from the oven therein, which is then mixed with the fresh air from the breather 27 as it is drawn back in the circulating fan in such proportions as may be desired by means of the damper 28. The supply coming through the exhaust chamber 26 may also be regulated by means of damper 29 placed in the circulating pipe 30. The supply fan 23 exhausts the air into the circulating pipes 31 and 32, and into the lower plenum chamber 33, and thence distributed through the portals 34 into the oven. Inside the oven and opposite the portals 34, are the baffle plates 35 which start the fresh air in an upward direction, passing through the heat coils, or units, and thence diffusing through the entire oven. The heavy gases and fumes from the baking materials settle to the bottom of the oven and are drawn off through the portals 36 into the exhaust chambers 37. Chambers 37 are exhausted by means of the exhaust fan 22, drawing the air through the pipes 38 and 39, and exhausting same through the outlet 40 into an open chimney. The amount of air drawn from the exhaust chambers 37 may be regulated by means of the dampers 41 placed in the exhaust pipes 38 and 39.

In describing the above invention, I desire it to be understood that the same is merely illustrative of the air circulating system now in use, and I do not wish to be confined to the precise construction and arrangement of parts is shown. The above description is to include any substitute construction and arrangement of parts which are obviously equivalent to those herein described.

Having fully described my circulating system and working parts thereof, what I claim as my invention and desire to secure by Letters Patent is:

1. In an oven, in combination with an air heating apparatus, a circulating system comprising a double fan unit, means for operating said fan, said double fan unit consisting of an exhaust fan and a circulating fan, exhaust chambers means for connecting the exhaust fan to the lower exhaust chambers of the oven, circulating chambers and means for connecting the circulating fan with the upper and lower chambers of the oven.

2. In an oven in combination with an air heating apparatus, a circulating system comprising a circulating fan, an exhaust fan, means for operating same, upper and lower circulating air chambers, means for connecting the circulating fan thereto, means for distributing the air through the oven, means for connecting the exhaust fan to the exhaust chamber and means for regulating the flow of air.

3. An oven in combination with an air heating apparatus, a circulating system comprising a circulating fan, an exhaust fan, means for operating same, means for connecting the circulating fan with the upper and lower parts of the oven, means for connecting the exhaust fan with the lower part of the oven, and means for regulating the flow of air through each, and means for distributing the air through the oven.

4. An oven in combination with an air heating apparatus, a circulating system, a circulating fan, an exhaust fan, means for operating same, upper and lower exhaust chambers, an intake pipe connecting the circulating fan with the upper exhaust chamber of the oven, a separate air intake breather also connected with the circulating fan intake, means for regulating the proportions of hot air from the exhaust chamber to the fresh air from the intake breather as it enters the fan, and means for distributing same through the oven, and means for exhausting the air from the oven through the exhaust fan.

In testimony whereof I, WILLIAM C. EHMKA, sign these specifications.

WM. C. EHMKA.

Witnesses:
 JOSEPH H. MARTIN,
 HARRY D. FENSKE.